(No Model.)
E. WESTON.
SYSTEM FOR THE ELECTRIC TRANSMISSION OF POWER.
No. 272,365.  Patented Feb. 13, 1883.
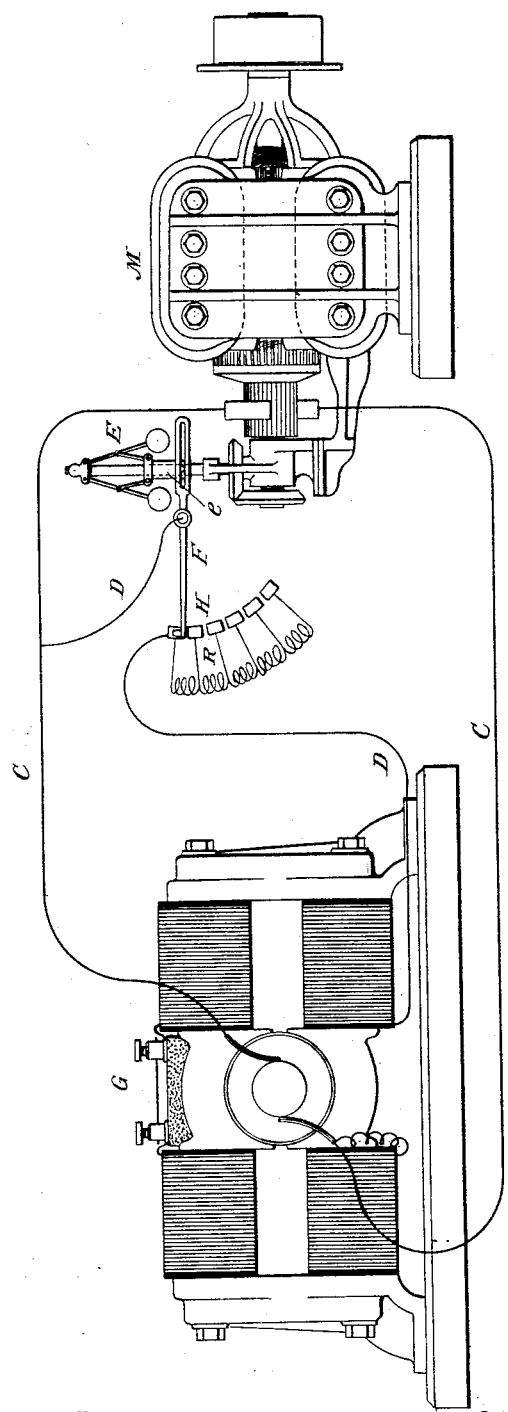
Attest:
Raymond G. Barnes.
W. Firsby
Inventor:
Edward Weston
By Parker W. Page
atty.

ated in thinking

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

SYSTEM FOR THE ELECTRIC TRANSMISSION OF POWER.

SPECIFICATION forming part of Letters Patent No. 272,365, dated February 13, 1883.

Application filed May 8, 1882. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Systems for the Electrical Transmission of Power, of which the following is a specification, reference being had to the drawing accompanying and forming a part of the same.

My invention relates to systems for the transmission of power by means of a dynamo-electric machine and an electro-magnetic motor included in an electric circuit; and it consists in a novel combination of means for regulating the current generated by the machine, according to the work to be done by the motor, so that the speed of the motor may be maintained as nearly as possible uniform.

In other applications of even date herewith I have described methods of regulation in connection with systems of this character involving the use of one or more small dynamo-machines in addition to those in the main circuit, the purpose of which was to generate a current proportioned to the speed of the motor, which current was utilized to operate mechanisms arranged to vary the magnetic intensity of the field-magnets of the main generator or to shift the position of the brushes of the same. By my present system these supplementary machines are dispensed with entirely and a centrifugal governor or its equivalent combined with the motor, and connected with mechanism which, by varying the resistance in a circuit including the field-magnetic coils of the generator, regulates at all times the intensity of the field.

In the accompanying drawing the invention is illustrated by a diagram, in which the letter G designates a dynamo-electric generator, M a motor, and C C the circuit including the same. In gear with the motor-shaft is a centrifugal governor, E, the arms of which in rising lift a collar, *e*, and by so doing lift the short arm of a pivoted lever, F. Along the path of downward movement of said lever are arranged a number of contact-plates, H, connected by resistance-coils R. The first plate is connected with one end of a derived circuit including the field-magnets of the generator G, and the lever F with the other, so that the amount of current which flows from one conductor of the main line to the other through the field of the generator will depend upon the position of the lever G and the amount of resistance introduced by it in the derived circuit.

The action of the devices is as follows: When the motor is at rest the lever F remains in contact with the first of the plates H, so that no resistance is interposed by it in the derived circuit D. On starting the generator the motor acquires a speed which causes the arms of the governor to rise, thus introducing resistance in circuit D and preventing a too high rate of speed by the effect which it exercises upon the generator. When the motor is loaded and its speed reduced the governor falls, thereby cutting out resistance and causing the machine to furnish more current. In this way an equilibrium is maintained and a practically-uniform speed imparted to the motor.

In this system the circuit D may evidently be independent of the main circuit C, though the derived circuit for practical purposes is believed to be the most economical.

So far as the construction of the governor is concerned, it is evident that many variations may be made, and I would state that I regard any form of device by means of which the requisite movement can be imparted to the lever F as within the scope of my invention.

It will be seen that from the nature of the case it is designed to use but one motor, and that the governor should act to vary the resistance of the field-circuit for every variation in the load imposed upon the motor.

I am aware that a variable resistance in the field-circuit of a machine has been controlled by a governor driven by a motor in a system where other motors or devices for utilizing the current were used. In such cases, however, the governing motors have been included in branch or derived circuits, and under such conditions that the variations of resistance in the field-circuit were due primarily to variations in the amount of current flowing through the motor. The purpose and effect of my system are widely different from this, the conditions of my system being such that the variations of resistance are caused primarily by variations in the load imposed upon the motor.

Having now described my invention, what I claim is—

The combination, with a main electric circuit and a dynamo-electric machine, of a single electro-magnetic motor driven by the machine and adapted to perform work, as in driving machinery or the like, a circuit including the field-magnet coils of the machine, a variable resistance included therein, and a device such as a centrifugal governor driven by the motor and operating to vary the said resistance in proportion to variations in the load imposed upon the motor, substantially as set forth.

In testimony whereof I have hereunto set my hand this 6th day of May, 1882.

EDWARD WESTON.

Witnesses:
HENRY A. BECKMEYER,
W. FRISBY.